April 14, 1925.
C. A. DAVIS ET AL
COVER FOR SPRINGS
Filed Aug. 21, 1923
1,533,397
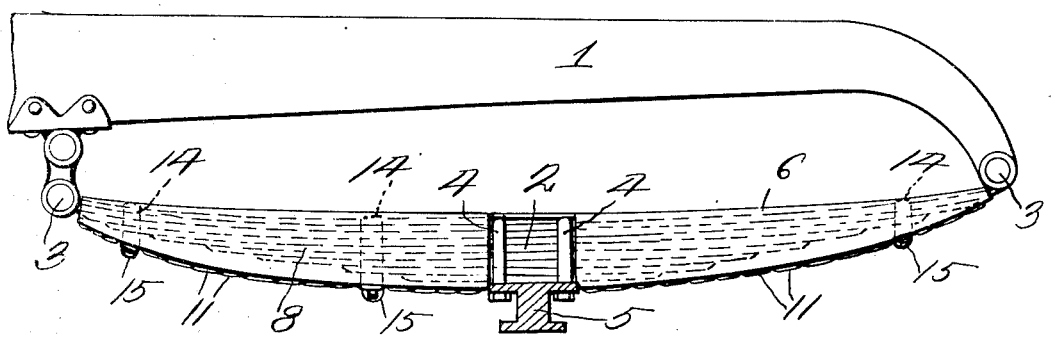
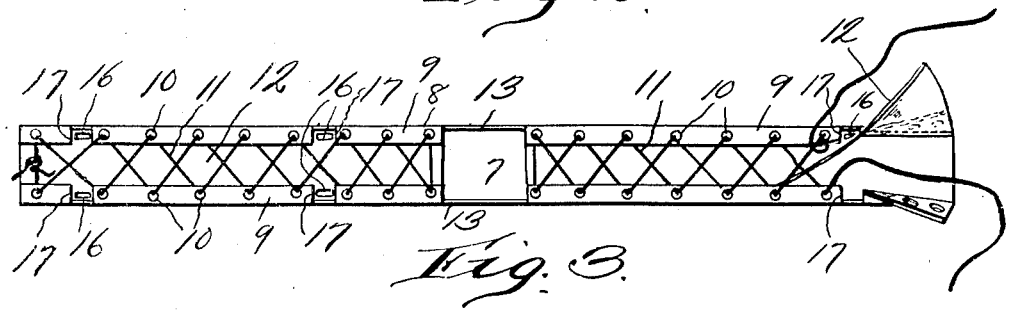
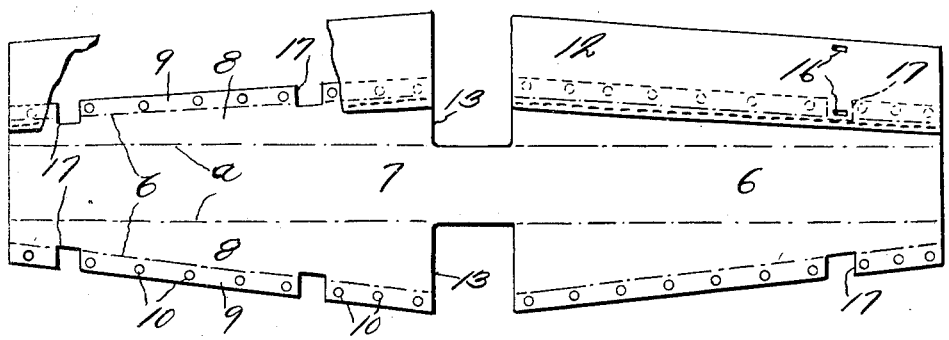
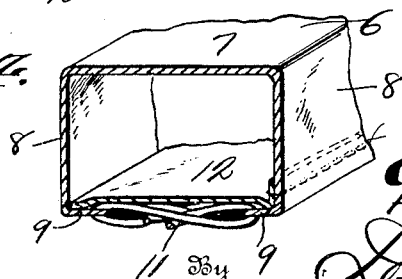

Patented Apr. 14, 1925.

1,533,397

UNITED STATES PATENT OFFICE.

CHARLES ALBERT DAVIS AND HOWARD L. McCLOY, OF STAUFFER, PENNSYLVANIA.

COVER FOR SPRINGS.

Application filed August 21, 1923. Serial No. 658,552.

*To all whom it may concern:*

Be it known that we, CHARLES A. DAVIS and HOWARD L. McCLOY, citizens of the United States, residing at Stauffer, in the county of Westmoreland, State of Pennsylvania, have invented a new and useful Cover for Springs; and we do hereby declare the following to be a full, clear, and exact description of the invention, such as will enable others skilled in the art to which it appertains to make and use the same.

The invention relates to covers for springs preferably of the semielliptic type, and has for its object to provide a device of this character for encasing the spring in a manner whereby it will be protected from weather and consequently the necessity of lubricating the same is reduced to a minimum.

A further object is to provide a cover for a spring which is preferably formed from leather and provided with a lacing, which lacing when the cover is in position on the spring is disposed underneath the spring where it is concealed from view, thereby not detracting from the appearance of the automobile.

A further object is to provide oppositely disposed recesses in the sheet of material from which the cover is formed for the reception of the automobile axle when the cover is placed on the spring.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a side elevation of the cover showing the same applied to a conventional form of automobile spring.

Figure 2 is a bottom plan view of the cover.

Figure 3 is an inside plan view of the cover showing the same in open position.

Figure 4 is a detail transverse sectional view through the cover.

Referring to the drawing, the numeral 1 designates a portion of an automobile frame and 2 an elliptic spring of the leaf type, which has its ends connected to the frame 1 at 3 in the usual manner. Secured to the underside of the spring 2 by means of U-bolts 4 is a conventional form of axle 5, and the U-bolt structure is of conventional form. It has been found that leaf springs used in connection with vehicles, unless the same are thoroughly lubricated from time to time develop squeaking, which is objectionable, and at the same time causes rapid deterioration of the spring. To overcome this difficulty it is necessary to lubricate the springs from time to time, however if foreign matter, such for instance as grit, even where the spring is thoroughly lubricated enters between the leaves of the spring and consequently lubricant does not stay between the springs for any length of time. To obviate this difficulty a cover 6 is provided for the spring, which cover is preferably formed from leather, however it is to be understood that it may be formed from any suitable material. The cover 6 comprises an elongated body member 7, which when placed on the top of the spring 2 and folded on the lines *a* form the sides 8 of the cover which register with the sides of the spring 2. The sides 8 are then folded on the lines *b* so that the portions 9 underlie the underside of the spring 2. The portions 9 are provided with eyelets 10 for the reception of lacings 11 whereby the cover may be securely fastened on the spring. Secured to one of the portions 8 is a tongue 12, which engages the underside of the spring 2 and underlies the portions 9 of the sides 8 for preventing entrance of foreign matter and water into the cover. The opposite sides of the cover are provided with recesses 13, which recesses when the cover is in position on the spring receive the sides of the U-bolts 4 and the upper sides of the axle 5. In some leaf springs leaf clamping members 14 are used, which are U-bolts, and to accommodate the ends 15 of the U-bolts, the tongue 12 is provided with spaced apertures 16, with which apertures recesses 17 carried by the portions 9 register, therefore it will be seen that the cover will not be bulged downwardly adjacent the U-bolts 14.

From the above it will be seen that a cover is provided for semielliptic leaf springs of automobiles which cover will not only protect the springs, reduce the necessity of lubricating the springs to a minimum, but will also add to the appearance of the vehicle, as the cover can be easily painted to correspond with the color of the vehicle, or a contrasting color. It is obvious that the details of construction will vary according to the spring structure and according to the type of automobile on which it is used.

The invention having been set forth what is claimed as new and useful is:—

The combination with a semielliptic vehicle spring, clip ends carried by the spring adjacent the ends thereof at opposite sides of the spring, of a cover for said spring, said cover comprising an elongated body portion engaging the upper side of the spring, side members carried by said body portion and engaging the sides of the spring, members carried by the side portion adapted to underlie the spring and provided with recesses for the reception of the clip ends, a flap secured to one of the side portions and engaging the under side of the spring and disposed between the spring and the portions of the sides which underlie the spring and provided with apertures in registration with the recesses for the reception of the clip ends, and lacings connecting the underlying portions of the sides.

In testimony whereof we have signed our names to this specification in the presence of two subscribing witnesses.

CHARLES ALBERT DAVIS.
HOWARD L. McCLOY.

Witnesses:
EMMY JONES,
C. A. SHERRICK.